Dec. 16, 1924.  1,519,174

A. A. TOMLIN

SPINNING BAIT

Filed May 4, 1923

INVENTOR.
A. A. Tomlin.
BY J. Edward Maybee.
ATTY.

Patented Dec. 16, 1924.

1,519,174

UNITED STATES PATENT OFFICE.

ALFRED ALBERT TOMLIN, OF TORONTO, ONTARIO, CANADA.

SPINNING BAIT.

Application filed May 4, 1923. Serial No. 636,575.

*To all whom it may concern:*

Be it known that I, ALFRED A. TOMLIN, of the city of Toronto, in the county of York, Province of Ontario, Canada, a subject of the King of Great Britain, have invented certain new and useful Improvements in Spinning Baits, of which the following is a specification.

This invention relates to baits used for fishing and my object is to provide a bait of simple design, that will spin while drawn slowly through the water and will cause no disturbance in the latter, that will present a fish-like shape while swimming, and is adapted to cause a number of light reflections at each revolution whereby the fish will be better attracted thereto.

I attain my object by means of the constructions hereinafter described and illustrated in the accompanying drawings in which—

Figure 1:
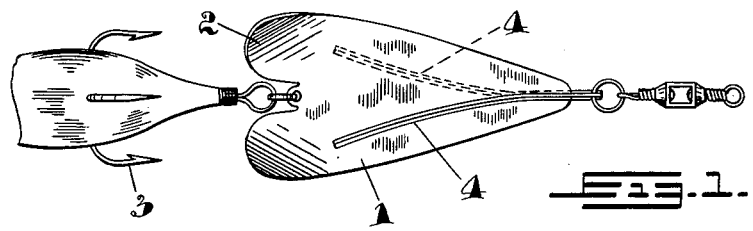
Figure 2:
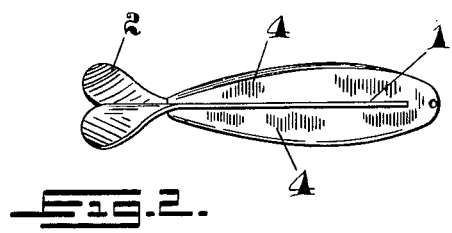
Figure 3:
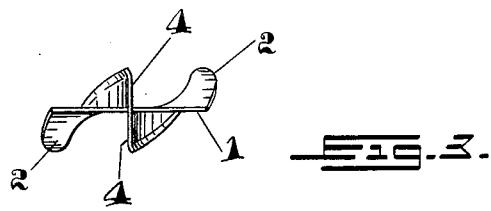
Figure 4:
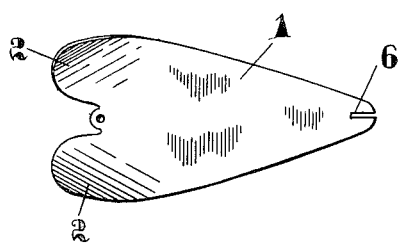

Fig. 1 is a plan view of my improved bait showing the hooks and swivel attached thereto;

Fig. 2 a side elevation of the bait;

Fig. 3 a front end view of the same;

Fig. 4 a plan view of the body portion blank; and

Figure 5:
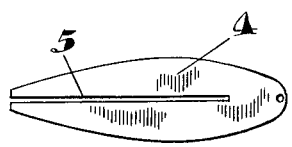

Fig. 5 a side elevation of the cut blank for forming the fins.

In the drawings like numerals of reference indicate corresponding parts in the different figures.

The body portion 1 of the bait is formed with a pair of tail portions 2 which are curled or bent in opposite directions to one another so that the bait will have a tendency to spin when drawn through the water. The hooks 3 are suitably connected to the rear end of the body portion 1. It will be noted that the latter is flat except for the tails 2.

The object of a spinning bait is to so attract the fish that it will strike the bait whether hungry or not. The so called spinning baits now on the market have to be drawn quickly through the water to cause them to spin and when drawn slowly through the water they fail to rotate and merely wobble or "flop" about in the water. These baits have bodies of minnow shape or are concavo-convex in cross-section with oppositely bent tail portions and fins which tend to spin the baits but even if the latter happened, hardly any attraction would be caused.

To overcome the above difficulties, I provide the body portion 1 with the fins 4 extending longitudinally of the body and substantially normal to the surface of each side thereof. These fins are formed from a strip of sheet metal having a slot 5 formed therein to separate the rear ends of the fins, which ends are curved rearwardly in opposite directions relative to the median line of the body portion 1 (see Figs. 1 and 3) and are suitably secured to the latter. The rear ends of the fins are spaced apart at their extremities and the latter are terminated adjacent the downward curvature of the tail portions 2. The convex sides of the curved fins 4 are directed towards the median line of the body portion 1. The body portion is of triangular configuration and tapers from the rear end towards the forward end which is preferably notched at 6 to receive the forward end of the integral fins 4. These fins are curved in a fore and aft direction so that a side elevation of the fins forms the outline of a fish. From the above description it is obvious that when the bait is pulled through the water, the latter will re-act against the rearwardly curved fins 4 to spin the bait.

The tail portions 2 lie across the paths of the water passing along the fins, so that the water passing out of contact with each fin will be directed over the adjacent tail portion to tend to form a vacuum and thus reduce the pressure against the rear sides of the tail to facilitate the spinning of the bait.

The body portion 1 lies between the two sets of fins and tails to cut through the water so that different paths or portions of water act against the fins and the tails located at opposite sides of the body portion, the latter thus steadying the bait so that the axis of rotation is along the median line of the body portion. This arrangement ensures the bait spinning when drawn slowly through the water and with no disturbance, sufficient to form bubbles, in the water.

To attract the attention of a fish the bait is formed of suitable material having light reflecting surfaces so that, as the bait revolves in the water, light is reflected from the sides or surfaces of the bait, and thus cause a series of flashes at each revolution. With my construction of bait having the plate forming the body portion 1 and the plate forming the fins 4 intersecting one another substantially at right angles, the surfaces of the fins 4 are separated by the transverse body portion 1 and the surfaces of the latter are separated by the said fins, the bait thus having eight reflecting surfaces each adapted to cause a flash at each revolution of the bait.

What I claim as my invention is:—

1. A spinning bait having a substantially flat body portion provided with oppositely bent tail portions formed at the rear end of the said body portion; and a fin located at each side of the body portion and extending longitudinally thereof and substantially normal to the surface of the said flat body portion, the fins extending rearwardly in opposite directions relative to the median line of the body portion and their rear ends spaced apart at their extremities.

2. A bait constructed as set forth in claim 1 in which the fins are substantially normal to the surface of the said flat body portion for their entire length.

3. A bait constructed as set forth in claim 1 in which the fins are curved rearwardly and have their convex sides directed towards the median line of the body portion.

4. A spinning bait having a substantially flat body portion of substantially triangular configuration and tapering from its rear end towards its forward end and provided with oppositely bent tail portions spaced apart and formed at the rear end of the said body portion; and a fin located at each side of the body portion and extending longitudinally thereof and substantially normal to the surface of the said flat body portion, the fins extending rearwardly in opposite directions relative to the median line of the body portion and their rear ends spaced apart at their extremities.

Signed at Toronto, Canada, this 13 day of March, 1923.

ALFRED ALBERT TOMLIN.